Figure 1:

INVENTORS.
JOHN L. GRING
JOHN MOOI a b

United States Patent Office 3,376,106
Patented Apr. 2, 1968

3,376,106
BOEHMITE ALUMINA PRODUCTS
John L. Gring and John Mooi, Homewood, Ill., assignors to Sinclair Refining Company, New York, N.Y., a corporation of Maine
Original application May 22, 1961, Ser. No. 111,798, now Patent No. 3,245,919, dated Apr. 12, 1966. Divided and this application Apr. 28, 1965, Ser. No. 462,775
8 Claims. (Cl. 23—141)

This application is a division of application Ser. No. 111,798, filed May 22, 1961 now Patent No. 3,245,919.

The present invention relates to the catalytic field and is particularly concerned with a novel boehmite base precursor for catalytically-active metal components to provide a variety of catalysts. The novel boehmite-containing catalysts are useful in the hydrocarbon conversion field and depending upon the catalytic metal employed, can be used, for instance, in reforming, hydrodesulfurization and dehydrogenation processes.

Boehmite with an X-ray diffraction pattern of very small crystalline size, for instance, averaging about 40 A. is known. It appears as an interlocked, shapeless mass as shown by electron micrographs. Boehmite with homogeneous fibrillar structure is shown in U.S. Patent No. 2,915,475. The novel boehmite of the present invention is generally composed of minute elongated particles which apparently are aggregations of smaller crystalline units of boehmite. High resolution electron microscopy, for instance at approximately 150,000 magnifications, reveals that these elongated particles have a non-homogeneous appearance, indicating that they are composed of some smaller sub-units, and are not integral single crystals. In this sense the particles are polycrystalline aggregations of small crystals. Generally, the elongated particles of alumina monohydrate exhibit irregular edges.

Generally, as disclosed by electron microscope studies, these elongated particles have average dimensions of the following order of magnitude: the largest dimension, e.g. length, of about 500 or 1500 to 20,000 A., and a smaller dimension, e.g. width, of about 70 to 3000 A. The length to width ratio is generally at least about 2 to 1 and usually not over about 15 to 20 or even 30 to 1. X-ray diffraction data indicate that these materials have an average unit crystallite size on the order of about 50 to 200 A. in size. Therefore, these particles are aggregate, composite or integral groups of the smaller crystallites.

A representative sample of particles of the novel boehmite of the present invention is characterized by an average crystalline size determined from the X-ray diffraction pattern, generally greater than about 40 or 50 A., for instance, of about 80 to 200 A. The novel relatively large crystalline boehmite when oven-dried to, say 110° C., has a total pore volume generally of about 0.5 to 2.5 cc./gram and pore structures which total at least about 0.5 cc./gram in pores larger than about 80 or even larger than about 100 A. in size (radius).

Pore distributions are computed from nitrogen desorption isotherms, at −195° C., by use of a modified BJH calculation (Wheeler, in Catalysis, vol. 11, ed. by P. H. Emmett). The result of these computations is a plot of the log pore size v. cumulative pore volume (cc./grams)—volume in pores $\leq$ the given pore size. The pore size is defined as the Kelvin radius, assuming cylindrical pores. It is known, of course, that the pores are not cylindrical, hence the sizes are equivalent pore radii. The experimental points are determined with sufficient accuracy that a plot of $\Delta v/\Delta \log r$. vs. log $r$ provides a relatively smooth pore distribution plot.

In general, uncalcined crystalline boehmite aluminas have a single pore structure when percent boehmite is high; that is, there is a single peak in the pore distribution plot. When there is an appreciable quantity of amorphous alumina present an extra pore system (an extra peak) will be present consisting of very small pores (micro pores). We designate that pore system which comprises the major part of the pore volume as the major pore system. Usually this system is made up of the largest pores, called macro pores. Its volume is defined by the minima in the distribution plots; the size is designated at the peak.

We find that as crystallite size increases the pore size at the peak in the distribution plot for the major pore system increases, without much effect on pore volume. 40 to 50 A. boehmite has a small gel-like structure, with a peak at 30 to 40 A.; 140 A. boehmite has a peak at around 1100 A. On each side of these peaks there is pore volume, so that the actual curves provide the best descriptions of pore structures.

On extrusion or tabletting, pore sizes and pore volumes decrease, by compaction of the solid particles. Single pore systems usually remain. For extruded catalysts pore size increases with crystallite size, wherein pore volume tends to decrease somewhat.

The oven-dried (110° C.) novel boehmite is characterized by surface areas of generally from about 50 to 400 or more and preferably from about 100 to 300 square meters meters per gram when determined by nitrogen adsorption procedure (BET Method). It has advantageous pore characteristics, provides for stable catalytic metal dispersion, is of a relatively stable crushing strength, and is stable in a washed but undried condition. Catalysts from calcined boehmite whose pores are largely 60 A.U. or greater in size will exhibit improved diffusion characteristics and consequently are not as easily hampered by carbonaceous deposits during hydrocarbon processing when compared to known boehmites. The novel boehmite can include minor amounts of other materials, for instance, amorphous alumina and in this event, the resulting composition can contain a predominant amount of, or a major proportion of, the novel boehmite, for instance, from about 50 to 90% by weight. Compositions of this type containing minor amounts of amorphous alumina are particularly desirable when they are to be employed as supports for reforming catalysts.

By high resolution electron microscopy the predominant characteristic of these particles is that they are at least partly composed of well-crystallized sub-units (the very smallest apparent units which compose the particles) on the order of magnitude of about 50 to 1000 A. Some fine detail within these sub-units is of even a smaller order of magnitude. In this sense, the particles are polycrystalline aggregations of small crystals. In certain cases the polycrystalline identification is not as pronounced as in other cases, but an articulation and granularity can be observed in the particles of preparations. These particles are not homogeneous throughout their length; therefore, they consist of smaller sub-units. As previously mentioned in some cases the small sub-units show crystalline edges and corners, wherein in other cases the sub-units are granular in appearance.

In order to characterize the structure of these boehmite particles, a group of photomicrographs including FIGURES 1 to 6, has been presented in which the details of the particles are shown.

FIGURE 1 (Sample 410–1118; plate 3799, magnification 147,050×) is a good example showing the well-crystallized sub-units composing each particle. Note that there are many projecting single crystal edges and corners, and that these crystals seem to have grown together into the body of a platelet, thus forming a single integral platelet unit. These platelets are very wide in relation to their thickness. While the width of these platelets is about 3000

A., the thickness is approximately 200 A. and the length is about 10,000 to 20,000 A. Crystalline sub-units are about 200 to 1000 A. in size and are as wide as they are long.

Figure 2:

FIGURE 2 (Sample 410–7264; plate 3534; magnification 155,520×) shows a modification of this type of crystallized structure. In this sample the width of these platelets is about 500 to 5000 A., the length is about 500 to 10,000 A. and they are wide aggregations of certain smaller units. These small units in themselves show a crystalline structure. Sub-units in this sample are in the 200 to 400 A. range, and are also very thin as shown by the optical transparency. In this sample the gross particles are elongated platelets and are rather wide, short aggregations of the sub-units. These sub-units are flat having a length to width ratio of about 1:1.

Figure 3:

FIGURE 3 (Sample 410–1310; plate 3921; magnification 147,050×) shows a sample of boehmite in which the elongated platelets seem to be integral units but with a fine granular texture indicating that they are not homogeneous crystals but are constructed of fine granular units. The edges of the platelets are polycrystalline much as in FIGURE 1 but on a different scale. The platelets are on the order of 10,000 to 20,000 A. long and on the order of 1000 to 3000 A. wide. The sub-units of these platelets are on the order of 70 to 100 A in size.

Figure 4:
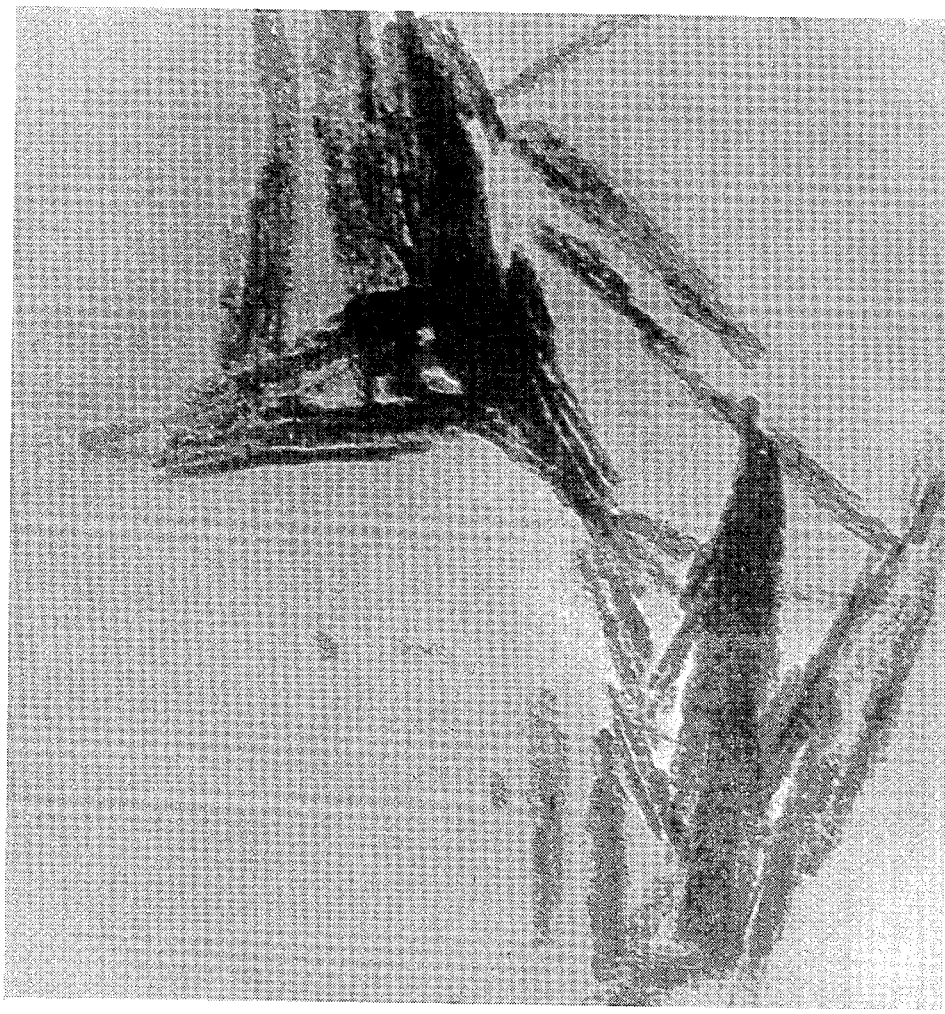

FIGURE 4 (Sample 410–1128; plate 3532; magnification 155,520×) shows a picture of an acicular boehmite. High resolution electron microscopy indicates that these acicular particles are not uniform particles but have again a fine granular structure within them. Small single crystal edges can be seen in these particles. The particles are about 5000 A. long and 100 to 1000 A. wide, with fine granular detail on the order of 100 to 200 A. in size.

Figure 5:

FIGURE 5 (Sample 410–1043; plate 3955; magnification 149,600×) shows a fine acicular type boehmite. The particles are 1500 to 5000 A. long and 70 to 500 A. wide. The texture of even these small particles is quite granular in nature, and the fine detail is on the order of 50 to 200 A. in size. Single crystal edges are evident in these particles on a smaller order of magnitude than in the previous samples.

Figure 6:
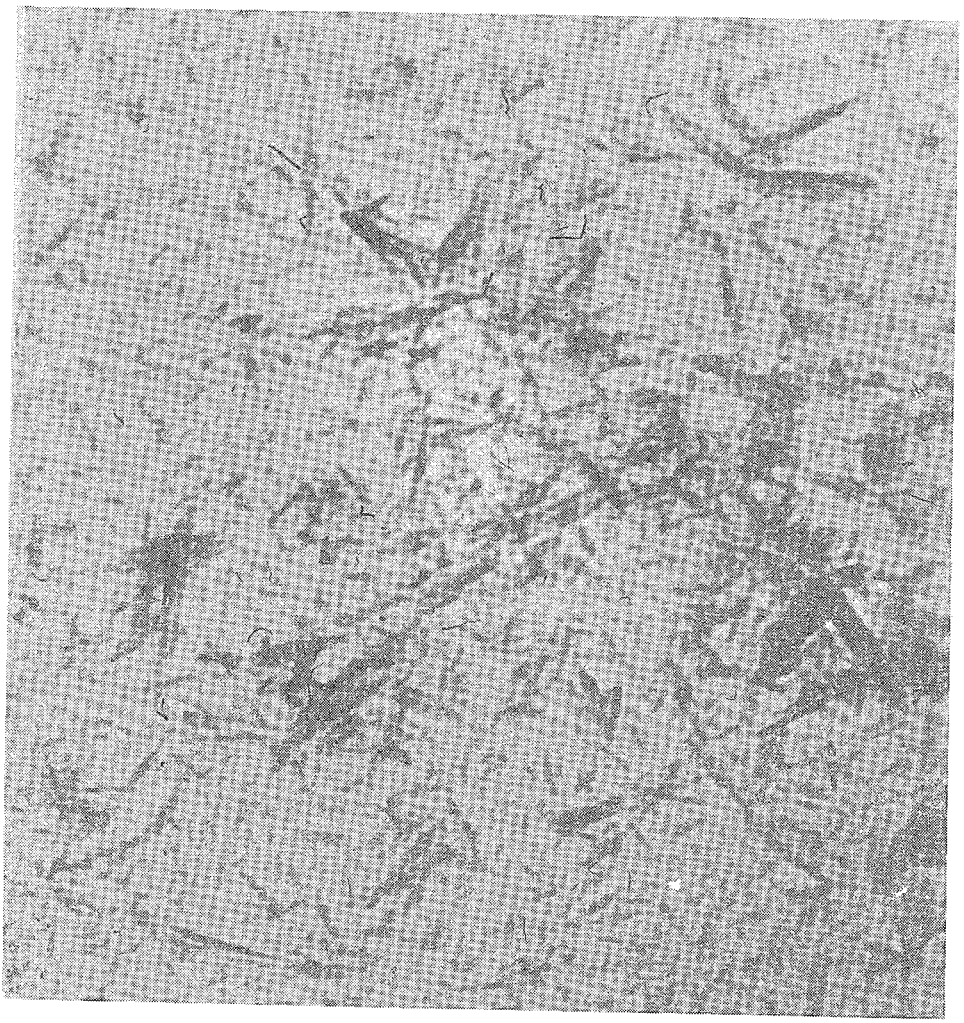

FIGURE 6 (Sample 410–1174; plate 3916; magnification 147,050×) is a photomicrograph of Du Pont's "Baymal" fibrous alumina at the same magnification as in the previous pictures. Inherent contrast in the specimen is not sufficient to give sharply focused edges. Fibers in this sample are small, being 300 to 2000 A. long and 50 to 150 A. wide. No evidence of fine granular or polycrystalline detail is apparent in these fibers.

Figure 7:
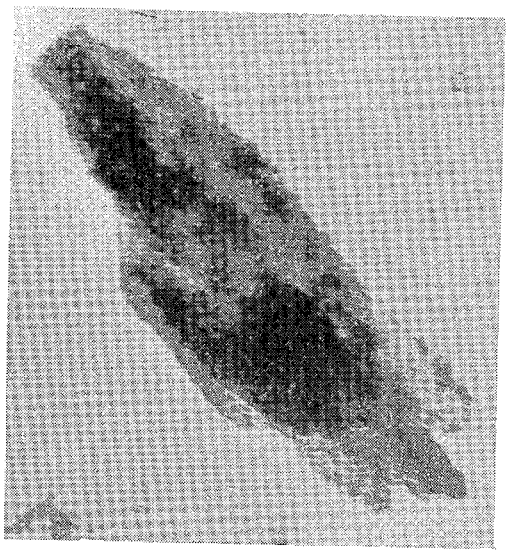
Figure 7:
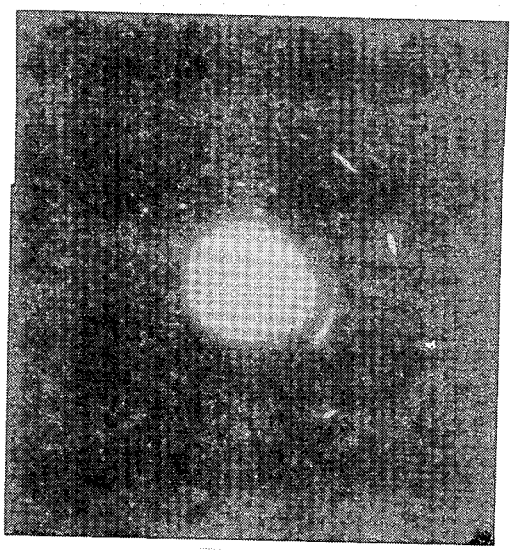

Some of the boehmite preparations of the present invention were examined by limited area electron diffraction. This is a technique by which electron diffraction patterns of a very small sample can be made. If a particle is a single crystal then the pattern observed is a symmetrical array of spots. If the specimen consists of randomly oriented small crystallites then the pattern is either a complete ring pattern or a spotty ring pattern depending on the number of crystallites. In FIGURE 7 a typical electron diffraction pattern of crystal boehmite particles of this invention is shown (lower picture b) along with a micrograph of the particle (upper picture a) which gave this pattern. Note that the pattern is a spotty ring pattern indicating a random array of small crystallites in the unit platelet. Thus this platelet is a random aggregation of small crystallites and is not a single crystal of boehmite. Since the fine detail as evidenced by high resolution microscopy and electron diffraction indicate that within a single particle there are small sub-units, some of which are quite obviously crystalline, it is thought that the elongated particles in these samples are polycrystalline aggregations of smaller crystalline units. They are not homogeneous throughout their length and a single particle therefore is not a single crystal.

The novel boehmite of the present invention can be prepared, for instance, by mixing an aqueous solution of alumina chloride and urea containing generally from about 0.3 to 1.3 molar, preferably about 0.3 to 0.4 molar concentration of aluminum chloride and generally about 0.075 to 4.0 molar, preferably about 0.5 to 1.0 molar concentration of urea, with a heated aqueous solution, preferably by adding the chloride solution to the heated solution. This solution is heated at temperatures generally from about 165° F. to boiling and is employed in a volume ratio to the aluminum chloride-urea solution of generally from about 0.01 to 0.5 to 1, preferably from about 0.10 to 0.20 to 1, to form a hydrous alumina by precipitation. The heated solution can be water, mother liquor (initial filtrate from a previous preparation), a slurry of alumina hydrate including other components from a previous preparation or an aqueous ammonium chloride solution containing generally from about 0.05 to 8.0 molar concentration, preferably from about 1.0 to 3.0 molar concentration of ammonium chloride. Water alone can be used since as the reaction proceeds, ammonium chloride is formed from the components of the aluminum chloride-urea solution. It is, however, preferable to have some ammonium chloride present initially.

It has been found that seeding the hot solution with boehmite of a given size promotes a larger sized boehmite product. Thus, a factor available to assist in the control of the average crystallite size of the boehmite product is the character of the seed applied. An excess of urea, based on the stoichiometric amount needed to react with the AlCl₃, generally more than 10% excess and preferably more than about 50% and up to about 100% excess, appears to be advantageous to obtain larger particles and larger crystallite size. Growth of the boehmite crystallites is also enhanced when following a relatively slow addition-precipitation procedure.

When using an ammonium chloride solution it is generally employed at a temperature of from about 165° F. to boiling temperature and preferably from about 190° F. to boiling. The aluminum chloride-urea solution is added to the ammonium chloride solution at a rate sufficient to allow the urea to disperse substantially uniformly in the ammonium chloride solution. The ammonium chloride solution is advantageously stirred during the addition which will generally take from about 1 to 200 hours, but usually from about 45 to 110 hours.

As an incident to the hydrogel formation, extraneous contaminating ions such as chloride ions may be introduced. These ions can be materially removed by washing the hydrogel with water for instance, to reduce the chloride ion concentration in the precipitated portion to less than about 0.2% on a dry basis for the purpose of promoting the formation of the boehmite gel. Dilute ammonium carbonate solution can be used advantageously during washing to lower the chloride content since it provides for a significantly faster rate of chloride removal than when only wate is used for washing. Moreover, a carbonate appears to have a desirable effect in producting hydrate of a more acicular and of larger crystallite size. If hot water is used in washing, the formation of a boehmite phase is promoted. After washing the hydrogel or alumina hydrate, the growth of the crystallite size of the boehmite can be enhanced by placing the hydrate in hot water and allowing it to digest (hydrothermal digestion).

The heating of the reaction mixture is desirable in order to hydrolyze urea at a reasonable rate and to promote the production of the hydrous alumina; however, it is also believed beneficial in promoting ionic mobility and influencing the dominant formation of boehmite from aluminum chloride. Stirring the reaction mixture has also been found desirable since it is conductive to homogeneity throughout the reaction mixture.

In a modification of the process an aqueous solution of the aluminum chloride and ammonium chloride can be heated to a refluxing state, ammonium hydroxide added to the refluxing solution up to the point of incipient precipitation of the aluminum hydroxide, and a urea solution added to the AlCl₃—NH₄Cl solution at as rapid a rate as possible to form a reaction mixture without causing cessation of the refluxing state. The reaction mixture is refluxed for a time sufficient to provide solid material, hydrous alumina, which upon drying transforms to boehmite of relatively large crystallite size.

The hydrous alumina of this invention is particularly effective for use as a catalyst component or catalyst support in any suitable reaction system and can be advantageously employed in hydrocarbon conversion reactions carried out at elevated temperatures in the presence of hydrogen such as, for instance, reforming, hydrocracking, hydrodesulfurization, isomerization, hydrogenation, dehydrogenation and the like. Thus, the hydrous alumina may be impregnated or otherwise composited with catalytically active, materials such as metals or metal compounds particularly those from Group VI-A and Group VIII of the Periodic Table.

These catalytic materials include, by ways of example, compounds of chromium, molybdenum, tungsten, iron, nickel, cobalt, the platinum group metals, such as platinum,, palladium, ruthenium, rhodium and iridium, or mixtures of two or more such compounds.

The amount of metal or metal oxide composited with the alumina will depend on a particular metal involved as well as on the intended use of the resulting composite. With metals of the platinum group, the amount of metal composited with the alumina will generally be within the approximate range of 0.01 to 2% by weight of the final composite. With metals of the iron group, usually larger amounts will be employed generally between about 0.1% to about 20% by weight of the final composite. With two or more metal or metal oxides, the total metal composited with the alumina will generally be within the approximate range of 1% to 30% by weight of the final composite. Thus, with a composite of alumina, molybdenum oxide and cobalt oxide, the final composition will generally contain from about 5% to about 15% by weight of molybdenum oxide and from about 0.5% to about 5% by weight of cobalt oxide and the remainder alumina.

Thus, platinum is an effective metal component to be combined with the alumina since composites of platinum and the alumina produced according to the invention have been found to be very active, particularly when the composite so prepared is to be employed in the reforming of petroleum naphtha fractions.

When making a catalyst the hydrous alumina can be impregnated using conventional procedures including direct impregnation with a suitable catalytic promoting solution without undergoing previous extensive filtering, washing, drying and calcining operations. The hydrous alumina is normally filtered and washed for purification, one or more catalytic promoting constituents incorporated either before or after filtration or other concentration, or before or after drying, and subsequently calcined before or after formation of macrosized particles by tabletting or extrusion. The macrosized particles can be formed before or after drying or calcination of the boehmite. The impregnation may also take place before or after calcining the alumina to the activated or gamma-alumina form.

In the preferred embodiment the aqueous slurry of washed hydrous alumina produced may be impregnated directly with the catalytic promoting material, particularly when the solids are diluted sufficiently to allow good stirring. With platinum, a preferred method of introduction is to contact the slurry of washed hydrous alumina produced with a solution of chloroplatinic acid while stirring, and to thereafter add an aqueous solution of hydrogen sulfide or otherwise introduce a suitable reagent to yield sulfide ion through the slurry with continued stirring, forming platinum sulfide. Another suitable method for introducing platinum into the hydrous alumina slurry is to form a separate aqueous solution of chloroplatinic acid and to introduce hydrogen sulfide gas into the solution until the chloroplatinic acid has formed a finely subdivided precipitate, which will occur as sulfide ion becomes available. Thus, chloroplatinic acid solution is normally light yellow and upon addition of hydrogen sulfide gas turns to a dark brown color. The brown suspension may then be combined with the slurry of hydrous alumina as a solution of chloroplatinic acid, other suitable platinum solutions may be employed including solutions or suspensions. In certain instances it may be desirable to use other than water only as a medium for adding the component to the alumina. In addition to platinum, other metals of the platinum family such as palladium may be combined with the alumina in a similar manner using, for example, palladium chloride as the impregnating solution.

The hydrous alumina produced in accordance with this invention is also effective as a support, carrier, or component for catalytic bodies including nickel and tungsten sulfides, as well as for carrying chromium or molybdenum. These latter metals may be deposited on the hydrous alumina before or after drying by contact thereof with suitable solutions of chromium or molybdenum-containing compounds. In similar fashion they hydrous alumina produced in accordance with the present process may be impregnated with nickel, iron, molybdenum, tungsten, cobalt or oxides of these metals. A particularly effective catalytic composite comprises alumina, molybdenum oxide and cobalt oxide. Another effective catalytic composite comprises alumina, molybdenum oxide and oxides of nickel and iron. See U.S. Patent No. 2,781,295.

In preparing such composities, any suitable soluble salt of the metal of the iron group may be employed. For cobalt, a particularly preferred salt is cobalt sulfate, although other soluble salts may be employed including cobalt nitrate and cobalt chloride. Soluble salts of nickel, suitable for use as impregnating solutions include tetramminenickel (II) nitrate nickelous nitrate, nickelous sulfate, nickel bromide, nickel fluosilicate, nickel chloride, and nickel iodide. Soluble iron salts include ferric nitrate, ferric chloride and ferrous sulfate. When compositing two or more metal compounds with the alumina, an impregnating solution comprising the two or more metal compounds may be employed as an impregnating solution or alternatively, the alumina may be initially composited with an impregnating solution of one metal compound, thereafter dried and/or calcined and then composited with a solution of the second metal compound. After impregnation, the resulting impregnated product is dried generally at a temperature within the range of about 170° F. to 400° F. for at least about six hours and up to about twenty four hours or more with a stream of air circulated to carry off the water vapor. The alumina catalyst mixture then may be formed into macrosize particles by a tabletting or extruding operation. The macrosized particles can be formed, however, before or after drying, calcination or impregnation. If the catalyst is to be in finely divided form, a grinding operation may follow drying or calcination. In the case of tabletting it is customary to incorporate a die lubricant which advantageously is organic and can be burned out by oxidation in the calcination step.

The pellets or finely divided particles are suitable for subjection to high temperature treatment or calcination at a temperature between about 500° F. and about 1400° F., usually about 700° F. and 1000° F., for a period at least sufficient to provide activated or gamma-alumina. Often calcination may take between about two and about thirty six hours. It is sometimes preferred that the calcining operation be conducted to minimize contact time of the alumina-containing product with water vapor at the high temperatures encountered. The product after drying generally contains a substantial amount of water, for example, from about 15 to 30% of water including that chemically combined, which is driven off at temperatures above 500° F. It is usually preferred to heat the alumina-containing composite at a rate of about 2 to 20° F. per minute up to about 600° F. with an air flow through the catalyst bed followed by heating at a slower rate to the final calcination temperature within the range of about 500° F. to 1400° F. especially if an organic die lubricant is to be oxidized without localized overheating. While the calcination or heat treatment will generally be conducted in air, it is also feasible to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen followed by heat treatment in an atmosphere of air or hydrogen. The novel alumina impregnated with one or more catalytically active materials is cooled to yield the finished product.

In general, the novel boehmite supports of the present invention containing catalytic amounts of a platinum group noble metal, e.g. platinum, can be used to reform under the usual conditions of reforming for instance, to reform light hydrocarbon stocks to produce gasoline, benzene and other selected aromatics. The hydrocarbon stock to be reformed is contacted with the catalyst in a reaction zone at an elevated temperature generally within the range of about 750° to about 1000° F. under a total pressure generally of about 200 to about 1000 p.s.i.g. and a hydrogen partial pressure approximating from about 3 to about 20 moles of hydrogen per mole of hydrocarbon charge stock. The catalyst is conveniently handled in the form of pellets or tablets which are placed in the reaction zone in the form of a fixed bed, although, in finely divided form, the catalyst may be handled in a fluidized reaction system. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and to provide for reheating between stages. The reactor effluent is passed through a liquid-gas separating system from which the fixed gases which usually approximate upwards of about 70% hydrogen are recovered for recycle. The liquid products then are fractionated in the usual way for recovery of a stabilized gasoline reformate or for recovery of the selected aromatic hydrocarbons.

In general, the novel boehmite supports of the present invention containing catalytic amounts of cobalt and molybdenum can be used for desulfurization of hydrocarbon oil stocks by bringing the oil in contact with the catalyst at a temperature generally of about 580 to 780° F. depending upon the stock and degree of desulfurization desired, at pressures generally from about 200 to 800 pounds per square inch, at hydrogen recycle ranges generally from 500 to 5000 standard cubic feet per barrel of feed and at space velocities (WHSV) generally varying from about 1 to 8 depending upon the stock being processed.

The novel boehmite supports the present invention containing catalytic amounts of chromia can be used for dehydrogenation of hydrocarbons by bringing the feedstock in contact with the catalyst at a temperature generally of about 800 to 1200° F. depending upon the stock and degree of dehydrogenation desired, at 0.1 to 100 p.s.i.g., and at space velocities (WHSV) varying from about 0.1 to 20 depending upon the stock being processed.

The following examples will serve to illustrate the invention.

Example I

This example 997-7-10 was one in which a solution of urea plus aluminum chloride at room temperature was slowly added to a hot, stirred solution of ammonium chloride. The trial yielded a hydrate evaluated by X-ray diffraction as FIGURE 4-type boehmite, oven-dried, with a crystallite size of 81 A. (Sample 410-4057). The equipment set-up included a two-liter fluted Pyrex flask, equipped with water cooled condenser open to atmosphere, stirrer, thermometer well, inlet for reactant solutions, Glascol heating mantle and devices for varying current to the mantle and stirring motor. The following procedure was employed.

96 grams of $AlCl_3 \cdot 6H_2O$ and 72 grams of urea were dissolved in water and made to 1.2 liters, equivalent to 0.3 molar with respect to aluminum chloride and 1.0 molar with respect to urea. This is 100% excess urea. During a period of 216 elapsed hours the above solution was added slowly into the reaction flask by stopcock-regulated gravity flow to 0.5 liter of heated and stirred solution containing 53.5 g. of ammonium chloride, equal to 2 molar initially to form a reaction mixture. Heating was discontinued and carbon dioxide was bubbled into the reaction flask over a three-hour period while the temperature decreased from 212° F. to 110° F. The reaction mixture was filtered through a Puchner funnel, an alumina hydrate cake was retained in the funnel, the cake was washed three times using 400 ml. of deionized water over a two-hour period, a portion of the filtrate from the third washing was tested for chloride ion content and the test was negative, indicating the substantial removal of this ion. A majority of the filter cake was dried in an oven at 110° C. and was designated Sample No. 410-4057.

The undried portion of the filter cake, designated Sample No. 410-4058, was not oven-dried and was studied with an electron microscope and a plate, No. 3190, was prepared with sections from magnifications at 7200× and at about 23,000×. The plate showed small needle-shaped particles in rather tight agglomerates of particles with a median size of about 500 A.U. in width and 2500 A.U. in length. These particles were formed during the continuous stirring (more than 216 hours) of the reaction medium, which in itself shows their sturdiness, i.e. being able to withstand the conditions in the stirring medium.

X-ray diffraction was used to study part of 410-4057, the oven-dried sample. The resulting data indicated that the only alumina hydrate phase positively present was boehmite $Al_2O_3 \cdot H_2O$. The pattern did not indicate any trihydrate (bayerite, randomite (nordstrandite) or gibbsite). By studying the diffraction peak at 38.5°, it was judged that the boehmite had a crystallite size of about 81 A.U. The dried sample which was composed of 79% boehmite had a surface area of 272 $M^2$./gm., a total pore volume of 1.56 cc./gm., and 0.8 cc./gm. volume in pores greater than 100 A.U. Analysis indicated at 20.2% weight loss of the portion studied when ignited at 1100° C. and that the chloride content was 0.7% by weight.

Part of Sample No. 410-4057 was ground, mixed with 4 weight percent "Sterotex" organic die-lubricant and tabletted into cylindrically-shaped bodies, ⅛″ d. x ⅛″ l., and assigned Sample No. 410-4061, a portion of which was calcined, to give Sample No. 410-4063, by heating the sample for three hours at 600° F. and three hours at 900° F. in an air-atmosphere electric muffle furnace. This results in the oxidation of the "Sterotex" and largely dehydrates the alumina.

Sample No. 410-4063 had a surface area equal to 287 square meters per gram as measured by nitrogen adsorption. The volume in pores larger than 100 A.U. was indicated to be 1.03 cc./g.; (Run B-556). The total pore volume was high at 1.55 cc./g. Electron microscope plate No. 3205, a carbon replica of this calcined product, indicated a porous texture at 7200×.

Other analytical data on this sample show that the iron content was less than 0.02%; the nickel was 0.006%; the content of lead, silver, cobalt and chromium were each less than 0.002%; and the sodium content was nil.

Example II

This example 1064-14-28 was essentially patterned after 997-7-10 in Example I above except that seven times the initial quantity and volume of reactant solutions were employed. The equipment included a fluted Pyrex flask of approximately 12 liters capacity. The alumina was of the FIG. 4 type, and the products from this example represent a very favorable series.

The aqueous solution of urea and aluminum chloride totalled 8.4 liters and contained 672 g. $AlCl_3 \cdot 6H_2O$ and 504 g. of urea, equal to 0.3 molar and 1.0 molar, respectively.

The aqueous ammonium chloride solution included 375 g. of $NH_4Cl$ in a total volume of 3.5 liters, and was thus 2.0 molar. This solution was heated in a stirred Pyrex flask to 212° F. at the time the solution of urea plus $AlCl_3$ was introduced. A time period of 99 hours was used to add the solution of urea and $AlCl_3$, while the contents of the flask were continuously stirred and heated. Heating and stirring were continued for 40 additional hours. The contents of the flask were filtered, an alumina hydrate cake was recovered and washed. A portion of this cake, Sample No. 410–4065, a FIGURE 4-type-alumina, was studied under an electron microscope.

An electron microscope plate, No. 3197, was made at 7200× to show the character of Sample 410–4065. In general the particles were about 600 to 1000 A.U. wide and 5,000 to 10,000 A.U. long. Some of these particles were needle-like, others were relatively flat and thin. The outline of the particles were irregular.

Another portion of the filter cake, designated Sample No. 410–4066, was oven-dried. X-ray studies of this sample, the oven-dried (110° C.) equivalent of the material shown in plate 3197, indicate that 54% of the product is 85 Angstroms crystallite size boehmite and none of the trihydrate varieties was present. Thus, besides the coarse boehmite there was presumably some amorphous material.

A platinum-alumina composition was processed into catalyst Sample No. 410–1032. This catalyst was prepared by the following procedure:

At the completion of the reaction (1064–14–28) the flask was cooled to 110° F. during 3 hours while a slow stream of carbon dioxide was bubbled through the slurry. The solid phase was retained on a filter, then repeatedly reslurried and filtered to lower the chloride content. Deionized water was used for dispersion of the filter cake. During the fourth cycle, some carbon dioxide was bubbled through the slurry to aid in displacing the adsorbed chloride ion. After using small portions of the slurry to gauge the alumina content, preparations were made to incorporate platinum.

The filter cake was dispersed in 2 liters of deionized water at room temperature. A pH of 6.5 was indicated by pHydrion paper. With continuous stirring, 100 ml. of chloroplatinic acid solution was added, proportioned to give 0.35% platinum/alumina. Eight minutes after adding the platinum-containing solution, the pH was about 5.5. Starting 1 minute later, 80 ml. of water saturated with hydrogen sulfide at room temperature was added. About 12 minutes after the addition of the hydrogen sulfide solution, the pH was about 5. Ten ml. of ammonium hydroxide solution, containing 2.5 ml. of 0.90 Sp. Gr. stock was added, and the pH was about 8.5. A stream of carbon dioxide was bubbled into the slurry for about 3 minutes. The pH was then 6.5 to 7. The slurry was divided into two 12″ x 18″ Pyrex trays and set into a 110° C. drying oven with forced air circulation.

The oven-dried material was light tan in color and uniform in appearance. It was ground to pass a 28-mesh sieve, mixed with 2 weight percent of Sterotex die-lubricant, and tabletted into ⅛″ d. x 1/16″ l. tablets (Sample 410–4071). These tablets indicated a crushing strength of 4.9 pounds per 1/16″ l. when tested on edge between horizontal anvils.

A 49 g. quantity of these tablets were calcined in a flowing stream of dried air and nitrogen at about 900° F. maximum. While the die lubricant was being oxidized, the influence gas mixture contained 0.3 volume percent oxygen, and the rate was about 300 liters per hour. After nine hours, 900° F. dried air was fed for 3 hours at 300 liters per hour, then dried air at 5 liters per hour during cooling. This product weighed 37 g. and was designed Sample No. 410–1009. A portion was ground and sieved in a dry box (−28° F. dew point); the 12 to 20-mesh cut platinum-alumina catalyst was numbered 410–1032.

This catalyst along with similarly prepared catalysts show advantageous characteristics relative to the following listed properties:

(1) *Crushing strength.*—The crush of the Sample was 11.2 lbs. per 1/16″ l. After 16 hours in an 1150° F. air atmosphere muffle, the crushing strength was 8.0 lbs. per 1/16″ l. with a percent decrease of 29%. Values of this type on commercially-produced large pore 0.35% Pt/$Al_2O_3$ catalysts show percent decreases frequently of 50% or more;

(2) *Volume in pores larger than 100 A. in size.*—In respect to volume in pores larger than 100 A., a platinum-alumina composition, Sample No. 410–4074, (prepared from a 30 g. charge of Sample 410–4071) calcined by essentially the same precedure used for Sample No. 410–1009 above except the 300 liters per hour of dry air was continued during cooling, with a surface area of 299 m.$^2$/gm., a total pore volume of 1.03 cc./gm., and 0.73 cc./gm. volume in pores greater than 100 A.U., had more than three and probably as much as four times as much volume in comparison to known materials in this class. This is a major difference and indicates that such a structure permits reforming of naphtha at lower pressures than are now generally used which is important economically. This select pore structure would be useful in catalysts for processing feedstocks of higher molecular weight than use in reforming.

(3) *Resistant to formation of elemental platinum when heated.*—The resistance toward forming elemental platinum when heated was gauged for Sample Nos. 410–1035, 410–1036 and 410–1037. After heating in air for 16 hours at 1200° F. it was found that the 410–1035 catalyst was best; i.e. lower percentage of the platinum grew to such as 150 A. particles than in comparable commercially available catalysts.

(4) *Very good catalystic activity for reforming.*—In order to gauge catalytic perforance (12 to 20-mesh platinum-alumina catalyst Sample No. 410–1032 was tested in 15 WHSV accelerated aging run 9–689. This resulted in values of 114 for relative activity and 120 for relative life.

In the accelerated aging run, the calcined catalysts were subjected to an accelerated aging test in comparison with a catalyst used commercially and exhibiting 93 relative activity and 95 relative life. Conditions were 15 WHSV, 200 lbs. pressure, 10/1 recycle ratio, and a 48-hour test period. The catalyst was tested in a bed of specified dilution. In terms of Research Octane Number (Clear) data were obtained for Relative Initial Activity (R.A.), and Relative Life (R.L) or relative barrels of product per pound of catalyst. Comparable 15 WHSV runs with other catalysts used commercially gave 63 RA+38 RL (R10–440) and 60 RA+35 RL (R9–581).

5) Moderate surface area and relatively stable—

| | Before 1,200° F. Calcination | After 16 Hrs. in Air Atm. Muffle at 1,200° F. |
|---|---|---|
| On crystalline Boehmite | 410–1,009 | 410–1,207 |
| Commercial derived catalyst | 980–15,016–CCC | 410–1,208 |

Surface area:
  410–1009=295 sq.m./g.
  410–1207=151 sq.m./g.
  980–15016=513 sq.m./g.
  410–1208=191 sq.m./g.

(6) *Platinum dispersion is considered good.*—Carbon monoxide chemisorption, for Sample No. 410-1009= 0.18 cc. (STP)/g. indicating good platinum dispersion.

Example III

Three runs were conducted essentially by adding urea solution into a boiling solution of aluminum chloride plus ammonium chloride; continuing refluxing for several days; washing but not drying; refluxing in well-stirred hot water for 6 days; filtering and oven-drying.

Run 1109-19-2 product was half removed from the reaction flash 31 hours after the AlCl$_3$+urea was added (during 96 hours). This was washed and shown to exhibit an acicular character; 83 A.U. crystallite sized, FIGURE 4 type-boehmite with a surface area—290 m.$^2$/g. (oven-dried at 110° C.) 86% boehmite, 1.10 cc./g. total pore volume and 0.6 cc./g. in pores over 100 A.U. after oven drying (410–1164). The dimensions of the particles were 1500 to 10,000 A. length and 200 to 1000 A. width. Part (41-1222) was used in additional run 1109-29-26, digested in hot water. After 4 days acicular particules of FIGURE 4 type-boehmite were present with dimensions of 1500 to 10,000 A. length and 400 to 1500 A. width, and XRD (X-ray diffraction) on oven-dried portions indicated 85 A.U. boehmite crystallites. After 2 more days digestion, samples 410-1224 and 410-1225 also showed acicular particules and 88 A.U. crystallite sized boehmite.

Thus, it is possible to place the washed alumina hydrate of some 83 A.U. crystallite sized-boehmite into hot water and cause it to grow. This is a different behavior than when left in the mother liquor.

The second half of Run 1109-19-2 was left in the reaction flask and kept hot 72 hours longer than the first half. The washed hydrate proved to be 75 A.U. sized-boehmite. Thus, the additional 72 hours of heating did not result in larger boehmite crystallites.

Example IV

Accurately weighed samples of predetermined weight of AlCl$_3$·6H$_2$O (Mallinkrodt's A.R. grade) and NH$_4$Cl (J. T. Baker Chemical Co.'s A.R. grade) were dissolved in a specified quantity of deionized water. This solution was placed in a 4-necked flask of appropriate size equipped with reflux condenser, paddle stirrer, thermowell and a device through which reagents could be added later. The contents of the flask were heated to boiling. For the concentrations employed here the boiling point of the solution was typically 214° F.±1°. In some cases 7 molar NH$_4$OH solution was added to the boiling solution up to the point of incipient precipitation of aluminum hydroxide. The quantity of NH$_4$OH necessary to cause incipient precipitation had been previously determined by a potentiometric titration of a similar system.

A predetermined and accurately weighted sample of urea (Mallinkrodt's U.S.P. grade) was dissolved in a specified quantity of deionized water. The urea solution was added to the boiling AlCl$_3$—NH$_4$Cl solution at as rapid a rate as possible without causing cessation of reflux in the flask. Addition time was generally about 1 hour.

The reaction was then maintained at boiling temperature for a period of 3 days.

After a certain reflux period the solid material was filtered from the mother liquor. The solid product was washed several times with dilute (NH$_4$)$_2$CO$_3$ solution. A wash solution was prepared by adding 2 drops of phenolphthalein to a quantity of deionized water equal to about one-half of the volume of the original reaction solution and then adding 2 molar (NH$_4$)$_2$CO$_3$ solution until the solution had a faint permanent pink color. The filter cake was then slurried in this solution for at least 30 minutes and filtered. At least 5 carbonate washings were performed on all products. Finally, the partially washed filter cake was twice slurried in deionized water, filtered and the filter cake dried at 120°C. over-night.

The initial AlCl$_3$—NH$_4$Cl solution charged to the flask was quite acidic (pH 2.3 to 2.5). pH was measured with a Beckman model M pH meter. The instrument was standardized against standard buffer solutions before measurements were taken.

If 7 molar NH$_4$OH solution was added to the AlCl$_3$—NH$_4$Cl solution it was noted that the first permanent precipitate appeared at a pH of ~3.5.

About 4 hours after the last of the urea solution had been added an opalescence devoloped in the flask. Shortly after this most of the aluminum ions had been precipitated and a slurry remained in the flask. The pH of the mother liquor was about 6 at this time. In the next 2 hours the pH increased to about 7 and remained at this value during the remainder of the reflux period.

Solid products were characterized chiefly by X-ray diffraction and electron microscopy. The identity was confirmed by X-ray diffraction. Crystal morphology was determined by the electron microscope. Other analytical methods used to suplement the above were surface area and pore volume studies and chemical analysis of the finished products.

In addition to identity, two other interesting quantities can be derived from the X-ray diffraction spectra. One of these, crystallite size, is helpful as a "fingerprint" of the various boehmite preparations. Crystallite size has been shown to correlate with surface area measured by nitrogen adsorption. Another quantity which we find helpful is the boehmite number. The boehmite number is, to a first approximation, a measure of percent boehmite in the sample. For instance, the amount of boehmite present in alumina material is indicated by the value of "boehmite number." This is an approximation for the percentage of boehmite. The value could be equal to, or proportional to, the actual percentage if a standard method of preparation is used.

A list of crystallite sizes, boehmite numbers and some surface area determinations are presented, along with initial concentrations of AlCl$_3$, and other information in Table I. All preparations listed in Table I show a rod-shaped form, even though minor in some instances.

By a combination of X-ray and electron microscope data it has been shown that boehmite is the only crystalline material produced by the urea precipitation process described above. The remaining material does not give an X-ray diffraction patern and is classified as amorphous.

TABLE I.—RESULTS OF UREA PRECIPITATION OF AlCl$_3$. 6H$_2$O STUDIES

The "initial concentration molarities" represent the concentration after all reactants are in the reaction flask, assuming no interaction during the hour or two used for the introduction of the final reagents.

| Run No. | 40-1 | 41-1 | 48-1 |
| --- | --- | --- | --- |
| Initial Conc. AlCl$_3$. 6H$_2$O mol/liter | 0.36 | 0.33 | 0.35 |
| Initial Conc. NH$_4$Cl mol/liter | 0.36 | 0.33 | 0.35 |
| Initial Conc. Urea mol/liter | 0.55 | 0.59 | 0.78 |
| Ml. 7 molar NH$_4$OH added/l. of Soln | 146 | 65 | 0 |
| Reflux time, days | 3 | 3 | 3 |
| Boehmite number, Procedure A | 75 | 72 | 70 |
| Crystallite size by XRD | 141 | 97 | 133 |
| Surface area, m.$^2$/g. (oven-dried at 110° C.) | 56 | 114 | 79 |
| Cl-analysis | 0.15 | 0.09 | |
| Total pore volume, cc./gm | | 0.82 | |
| Vol. in pores >100 A., cc./gm | | 0.69 | |
| Type of boehmite, Figure | | 3 | 3 |
| Average dimensions of particles: | | | |
| Length, A | | | 3,000-10, 750-3, 0 |
| Width, A | | | |

EXAMPLE V

This run demonstrated a procedure by which 67 A.U.-sized boehmite can be used as "seed," and realize 11 A.U.-sized, FIGURE 4-type boehmite (slightly coarser than the Example II product), of well-defined acicular nature.

Run 1109-42-9 was made in a fluted, two-liter flask, with a nominal working capacity of 1670 ml. Auxiliary equipment was provided for stirring, heating, refluxing overhead vapors, pump to feed solution of area plus aluminum chloride, thermometer well and feed inlet.

It was decided in advance that the initial liquid volume in the reaction flask should be one-quarter of the final volume; thus, 415 ml. This was to be mother liquor, (initial filtrate), from run 1109–24–2 to demonstrate usefulness as against using (more costly) ammonium chloride solution, plus alumina hydrate seed. It was also decided in advance that part of the available, washed, undried alumina hydrate filter cake from run 1064–75–23 would be used as seed. This particular alumina consisted of relatively small rod-like particles. A nominal size is about 200 A.U. in width and 3000 A.U. in length. It was also decided that the quantity of seed used should be equal to one-fifth of the alumina, $Al_2O_3$ basis, to be produced from the $AlCl_3$ used, calculated on stoichiometric, no loss, basis.

An additional advance choice was that the solution to be pumped in should be 0.33 and 0.75 molar with respect to $AlCl_3$ and urea, respectively. This ratio represents a 50% excess of urea. Inasmuch as 1255 ml. (1670–415) of 0.33 M. $AlCl_3$ was to be used, 21 g. $Al_2O_3$ would be the equivalent. Thus, seed equivalent to 21/5–4.2 g. $Al_2O_3$ was desired. This was supplied by 49 g. of washed filter cake (from run 1064–75–23). To simplify calculations it was assumed that the 49 g. of filter cake would have a volume of 49 ml. The volume of mother liquor would thus be about 366 ml.; (415–49).

The proper quantities of components were prepared. Mallinckrodt's A.R. grade $AlCl_3 \cdot 6H_2O$ and U.S.P. grade urea were used. The slurry was heated toward the boiling point, while stirring continuously. When the slurry temperature reached 204° F. the pumping of the solution of urea plus $AlCl_3$ was started. Forty-five minutes later the contents of the reaction flask was 214° F. and remained at that (reflux) temperature. The solution containing urea-plus-$AlCl_3$ was pumped at an average rate of 0.31 milliliter per minute during sixty-six elapsed hours. Stirring and heating were continued for 47 hours, at which time heating was stopped. After 1 hour, the slurry temperature was about 160° F. and its pH was close to 7, as indicated by pHydrion paper.

The alumina hydrate product was washed to remove chloride by first filtering than repeatedly re-slurring in deionized water and re-filtering. Dilute ammonium carbonate solution was added as needed during the first 14 cycles to keep the pH at 8 to 8.5. The two final cycles were with water only, after the filtrate from the 14th cycle indicated a very low chloride content, i.e. negative using nitric acid acidified portion plus silver nitrate. These washings were accomplished in some 26 elapsed hours.

A small portion of the final filter cake was dispersed in deionized water to yield (410–1274) from which electron microscope plate 3560 was prepared. Examination indicates acicular particles from 200 A.U. wide-1500 A.U. length to 1500 A.U. wide-15000 A.U. length. It was a FIGURE 4 type bochmite.

100 grams of the filter cake, nearly all of the remainder, was dried in a 110° C. oven, resulting in 29 grams of product. This was ground to pass a 20-mesh sieve, assigned No. 410–1275 and characterized. The weight percent loss at 1000° C.—20.8; the boehmite content was 84%, the boehmite crystallite size was 131 A.U., while none of the possible trihydrate phases registered on the X-ray diffraction pattern; the surface area equalled 168 square meters per gram (oven dried at 110° C.); the total pore volume was 2.0 cc./g. which included:

0.57 cc./g. in pores of 100–500 A.U. size;
0.42 cc./g. in pores of 500–1000 A.U. size; and
0.88 cc./g. in pores of over 1000 A.U. size.

These are considered to be very favorable properties of alumina hydrate for use in preparing catalysts.

The mother liquor used was from the portion of slurry heated 126 hours in the reaction flask, then filtered from the solid phase. This liquor was stored at room temperature. Part of the washed alumina hydrate product from run 1064–75–23 was used as seed. The washing procedure included 14 cycles of slurrying the alumina hydrate with two-liter quantities of deionized water, plus enough dilute ammonium carbonate solution to give pH 8 to 9, and filtering, then, two cycles using two-liter quantities of deionized water only, and filtering.

Following more than a 6-month period, 410–1087, was oven-dried and the boehmite crystallite size was 67 A. U. by X-ray diffraction study. Another portion of the washed hydrate of run 1064–75–23 was oven dried (Sample 410–1284) to check quality. X-ray diffraction study of the latter indicated 69 A.U. boehmite crystallite size, 88 Boehmite Number and no trihydrate. Thus, the hydrate was stable during more than several months at room temperature, and quite satisfactory for the application made.

A tabulation is presented to assist in correlating and summarizing information concerning physical studies of products arising from the different examples.

X-ray diffraction techniques have been utilized to provide some measure of the degree of conversion of the alumina hydrate to the crystalline form known as boehmite. Using the commercial Norelco X-ray diffractometer with copper target X-ray tube, nickel foil filter, standard slits of size 1 degree for the divergence slit and 0.006 inch for the receiving slit, the X-ray diffraction patterns are obtained by scanning at 1 degree per minute using the Brown strip chart recorder running at ½ degree per minute. The "Boehmite Number" which is a rough measure of the percentage boehmite in the sample, is obtained as the area under the 14 degree boehmite diffraction peak, measured by a planimeter. A reference sample believed to be 43 percent boehmite and 57 percent of other alumina hydrates is used for a daily standardization. The crystallite size L, in A. units is an estimate obtained from the width of one of the diffraction peaks, using the Scherrer equation in the form $$L = \frac{\lambda}{B \cos 1/2\theta}$$

Here B is the width of the line at half maximum measured in radiams, $\lambda$ is the wave length of the X-rays used in A. units (1.54), and $\theta$ is the spectrometer angle at which the peak occurs (38°). For this work the equation simplifies to $$L = \frac{93}{W_{1/2}}$$

where $W_{1/2}$ is the width of the line at half maximum intensity, expressed in degrees of spectrometer angle. This procedure is designated Procedure A.

An improved procedure, designated Procedure B, was adopted in the course of this work. The amount of boehmite present in a sample is estimated using the same experimental technique as in Procedure A but a correction factor of 0.92 is applied to the resultant boehmite number and this modified figure is called "Percent Boehmite." Procedure B involves a change in the experimental conditions for carrying out the measurement of crystallite size. The receiving slit width is decreased by a factor of two (.006″ to .003″), the scanning rate is decreased by a factor of eight (1 to ⅛ degree/min.), and the scale of the peak width is increased by a factor of two. Procedure B is particularly desirable for crystals greater than 80 A. in size. In this improved procedure, "boehmite numbers" can be replaced by "percent boehmite" and boehmite numbers from Procedure A can be converted by a factor of 0.92 to provide the percent boehmite. Moreover, values for both the crystallite size of the boehmite and the percent boehmite provide the number of crystallites per gram of alumina (N) which is derived from the crystallite size (L), the percent boehmite (P) and the density of boehmite (3.07) using the formula:

$$N = \frac{P \times 10^{22}}{L^3 \times 3.07}$$

Unless otherwise specified, the percent boehmite given in the specification and claims is based on Procedure B.

X-ray diffraction characterization of some of the boehmite samples set forth in this specification with values derived from the employment of Procedure A as well as Procedure B are set forth in the following tabulation:

| Sample No. | "Boehmite No.," Procedure A | Percent Boehmite, Procedure B | Crystallite Size | |
|---|---|---|---|---|
| | | | Procedure A | Procedure B |
| 410-4057 | 79 | 79 | 74 | 81 |
| 410-4066 | 50 | 54 | 90 | 85 |
| 410-1225 | 91 | 89 | 81 | 100 |
| 410-1275 | 87 | 84 | 106 | 131 |

Electron micrographs of alumina hydrates of the present invention from a large number of preparations have been examined.

EXAMPLE VI

FIGURE 1 is an electron micrograph of an alumina hydrate made by the following procedure. A solution which was 1.0 molar with respect to aluminum chloride and 1.8 molar with respect to urea was refluxed 12 hours to effect precipitation of hydrous alumina. The precipitate was filtered and then washed by repeatedly re-slurrying in ammonium carbonate solution and filtering. An oven-dry sample of the washed precipitate was essentially free of chloride (0.11%) and showed no X-ray diffraction pattern. Another portion of the washed cake was slurried in deionized water and refluxed for 87 days. The slurry was cooled and a portion used for the electron micrograph. The alumina, a FIGURE 1-type boehmite, had average dimensions of 10,000 to 20,000 A. length, 3000 A. width, dimensions on sub-units of particles of 200 to 100 A. (width and length), an average crystallite size of 143 A., and 101% boehmite (Procedure B).

Granular alumina of the type of FIGURE 2 has been produced when an ammonia solution and an aluminum chloride solution were added slowly to a hot reaction mixture (method of preparing alumina of catalysts 410-1317 and 600-10003). An ammonium carbonate solution may be substituted for the ammonia solution. Conditions should be such that the pH of the slurry is greater than 7.5 when the addition is complete, and the slurry must be refluxed to develop the structure. A 5-day reflux period has been used. If the pH during precipitation and at the beginning of the reflux period is 5 to 6, 5 days reflux produces material like FIGURE 4.

Material of the type of FIGURE 2 has been produced by a method in which an amorphous alumina hydrate is prepared from a boiling aluminum chloride solution by partially neutralizing the aluminum chloride with an ammonia solution and completing the precipitation by the hydrolysis of urea. When this amorphous alumina hydrate is refluxed for about 5 days it converts to crystalline boehmite with the appearance of FIGURE 2. Catalysts 410-1312 (the alumina of which contains 91% boehmite of 91 A.U, crystallite size) and 600-10002 (the alumina of which contains 86% boehmite of 92 A.U, crystallite size) were prepared from this type of alumina hydrate in which the amount of ammonia used was 0.4 and 0.75 equivalents of $NH_3$ per equivalent of $AlCl_3$ respectively. If some ammonium chloride is added to the aluminum chloride solution before the basic solution is added, the refluxed hydrate takes on an appearance more like FIGURE 3 although somewhat modified in that the platelets are imperfectly formed. Catalyst 410-1330 is derived from this type of material.

If an amorphous-boehmite alumina hydrate is precipitated at room temperature by the addition of an ammonia solution to an aluminum chloride solution, and this material is washed essentially chloride-free, slurried in water and refluxed, crystalline boehmite forms in appearance like FIGURE 2. This is the method used in preparing the precursor alumina hydrate of 410-1105 (the alumina of which contains 86% boehmite of 158 A.U. crystallite size).

EXAMPLE VII

Material of the form of FIGURE 2 has been prepared by the following procedure. 1500 ml. each of solutions of 0.8 M aluminum chloride and 24.5 M ammonium hydroxide were run at equal rates from separate burettes into 200 ml. of deionized water heated to boiling and stirred in a round bottom flask. The addition required 3 hours and heat was applied during the addition at such a rate that the contents of the flask remained at boiling. The resultant slurry was refluxed for 64 hours after which it was cooled and filtered. The alumina hydrate cake was washed by re-slurrying in 0.5% ammonium carbonate solution and filtering. This operation was repeated eight times. Two washings were then given in deionized water. A portion of the washed cake was dispersed in deionized water and refluxed for 7 days. A portion of the slurry was examined by electron microscopy and gave FIGURE 2 (410-7264). An oven-dry portion was analyzed by X-ray diffraction to be 72% boehmite of 119 A. crystallite size. It had a surface area of 188 m.$^2$/g. with a total pore volume of 1.33 cc./g., 1.08 cc./g. in pores greater than 100 A. and 1.18 cc./g. in pores greater than 80 A. The average dimensions of the particles were 500 to 10,000 A. length, 500 to 5000 A. width, and 200 to 400 A. for the sub-units of the particles.

Material of the form of FIGURE 3, besides being made by the method of 415-1330 mentioned above, can be prepared by the addition of an ammonium carbonate solution to a boiling aluminum chloride solution and refluxing the resultant mixture. 410-1319, the alumina of which contains 100% boehmite of 145 A.U. crystallite size, was prepared from this type of material. Ammonia may be substituted for some of the ammonium carbonate of the basic solution.

Material of the appearance of FIGURE 3 is also formed if a solution of aluminum chloride and urea is refluxed for 5 to 10 days. An amorphous alumina hydrate precipitate forms in 8 to 12 hours which slowly converts to crystalline boehmite. This was the method of preparation of the alumina hydrate for catalysts 410-1315 (the alumina of which contains 57% boehmite of 141 A.U. crystallite size), 410-1283 (the alumina of which contains 68% boehmite of 194 A.U. crystallite size), 410-1150 (the alumina of which contains 79% boehmite of 175 A.U. crystallite size) and 600-10001 (the alumina of which contains 57% boehmite of 141 A.U. crystallite size).

EXAMPLE VIII

Material of the form of FIGURE 3 has been prepared by the following procedure. 1350 g. of $AlCl_3 \cdot 6H_2O$ were dissolved in 15 l. of deionized water and heated to boiling. 960 g. of ammonium carbonate were dissolved in 15 l. of deionized water and this solution was added to the boiling aluminum chloride solution while it was being stirred rapidly. The addition required 3 hours. The temperature of the mixture was held between 99 and 100° C. during the addition. The resultant slurry was refluxed for 5 days after which it was filtered and washed by repeatedly re-slurrying in dilute ammonium carbonate solution and filtering. A portion of the washed cake was submitted for examination with the electron microscope and yielded FIGURE 3. A portion of the cake, Sample 410-1311, was over-dried and analyzed by X-ray diffraction showing 100% boehmite of 145 A. crystallite size. It had a surface area of 72 m.$^2$/g. with a total pore volume of 1.57 cc./g., 1.52 cc./g. in pores greater than 100 A. and 1.53 cc./g. in pores greater than 80 A. The average dimensions of the particles were 10,000 to 20,000 A. length, 1000 to 3000

A. width, and 70 to 100 A. for the sub-units of the particles.

Alumina hydrate in the form of FIGURE 4 can be prepared by the simultaneous hot additions of ammonia and aluminum chloride solutions at pH 5 to 6 as described above. Also in some cases in which a solution of aluminum chloride, ammonium chloride and urea are refluxed, material like FIGURE 4 is produced.

A method of preparation which produces boehmite in the form of FIGURE 4 or FIGURE 5 is one which uses a very slow addition of a solution of aluminum chloride and urea to a boiling reaction mixture. Often a period or reflux is allowed after the addition of the solution is complete. This is the method of preparation of catalysts having alumina in the form of FIGURE 4 and including catalysts 410–1350 (alumina composed of 84% boehmite of 106 A.U. crystallite size), 410–1058, 410–1077, 410–1163 and 410–1102 (alumina composed of 74% boehmite of 80 A.U. crystallite size). The aluminas of catalysts 410–1058, 410–1077 and 410–1163 were composed of 77% boehmite of 83 A.U. crystallite size. Occasionally seed material (crystalline boehmite of small crystal size) has been used in the boiling reaction mixture in order to produce boehmite of larger crystallite size but of the same morphology. This was done in the preparation of catalyst 600–10004 in the form of FIGURE 5, the alumina of which was composed of 85% boehmite of 139 A.U. crystallite size.

EXAMPLE IX.—Preparation and testing of a catalyst containing the novel boehmite, cobalt and molybdenum (500–5004)

The initial phase was the production of a washed, oven-dried alumina hydrate (represented by sample 410–1044, the alumina containing 75% boehmite of 75 (Procedure A) or 89 (Procedure B) A.U. crystallite size, from run 1064–45–37). The essential reaction was the slow hydrolysis of urea in a hot aqueous solution in such a manner that an acicular alumina hydrate precipitated. This hydrate was essentially thet monohydrate when washed and dried, and of relatively coarse crystallite size.

The reaction vessel was a fluted, round-bottomed Pyrex flask equipped with heater, stirrer, thermometer, water-cooled reflux condenser open to the air, inlet orifice for introducing a solution, and auxiliary equipment including a Sigmamotor pump with variable speed unit, and voltage-varying units in the electric circuits to the heater and stirrer.

The solution initially in the reaction flask was 1.6 liters of mother liquor from a previous similar alumina hydrate preparation (run 1064–41–28). The primary solute would have been ammonium chloride of about one molar concentration. The pH at room temperature was about 6.5. This is indicative that some unused, but dissolved ammonia from the hydrolysis of a moderate excess of urea was present, and increasing the pH by a unit or two.

The solution to be added by the pump was prepared by separately dissolving 672 g. of aluminum chloride hexahydrate and 378 g. of urea in deionized water, mixing, then diluting with deionized water to a total volume of 8.4 liters. That solution was 0.33 molar with respect to aluminum chloride and 0.75 molar with respect to urea, and represents a 50% excess of the latter on a stoichiometric basis.

After heating the flask and 1.6 liters of initial solution to 200° F. and still heating to refluxing conditions, the pump was started in order to add the solution of urea plus aluminum chloride. Using addition rates from 0.0 to 6.6 ml. per minute, the solution was added during 170 elapsed hours. Heating and stirring were continued for an additional day, after which the heating was stopped. Two liters of deionized water was added to the flask to partially replace some which had vaporized during the preparation to this stage.

The alumina hydrate was filtered from its mother liquor, and for 13 times re-dispersed in a liter volume of deionized water and re-filtered. During the first 11 times, portions of aqueous ammonium carbonate solution were added to adjust the pH to about 8.5 to 9 using phenolphthalein indicator. After a low chloride content was indicated in the filtrate from the 11th washing, two more re-slurries and filterings were made without using ammonium carbonate.

The washed alumina hydrate was sampled for characterization by use of an electron microscope, by X-ray diffraction methods, and other physical and analytical means. Essentially all of the hydrate was oven-dried, then ground to pass 100 mesh. Analytical data indicated that 105.2 g. of $Al_2O_3$, ignited-basis was represented by a dried cake. The surface area of the dried sample (410–1044) was 282 m.$^2$/g., it was a figure 4-type boehmite and the average dimensions of the particles were 750 to 10,000 A. length and 250 to 750 A. width.

The addition of the cobalt and molybdena constituents was patterned in accordance with procedures disclosed in U.S. Patent 2,898,308. The ratio of reagents was calculated to be equal to 2.5% cobalt, 9.3% molyybdena, balance alumina.

The ground, oven-dried alumina was dispersed in one liter of deionized water, contained in a two-liter fluted round-bottomed Pyrex reaction flask. The latter was equipped with stirrer, water-cooled reflux condenser, thermometer, reagent-inlet neck, and auxiliary devices for regulating electric current.

A mixture was made of 7.6 grams of cobalt carbonate and 11.5 grams of molybdenum trioxide, each in powdered form. After heating the aqueous slurry of alumina hydrate to 160° F., the mixture of cobalt carbonate plus molybdenum trioxide was incrementally added during a six-minute period. With continuous stirring, the slurry temperature was maintained at 160° F.±10° F. for 4 hours. After cooling to about 110° F. the solid phase was then separated by filtration, using a fritted glass Buchner funnel. The cake was oven-dried overnight at 115° C., while spread in a 12″ x 18″ Pyrex tray. The oven-dried product weighed 145 grams.

The 145 grams was ground and sieved to pass a 20-mesh sieve. Four weight percent of Sterotex die lubricant was aded, blended and tabletted to ⅛″ x ⅛″ size. The tablets were placed into a ceramic dish and into a room-temperature, air-atmosphere, electric muffle. By use of a Wheelco control unit the temperature was increased about 300° F. per hour to 900° F., maintained for 6 hours at 900° F. and cooling was commenced.

The above tablets were reground and processed into a calcined product having the following properties:

Crush=22.9 lbs./⅛″ length
Settled apparent bulk density=0.72 g./ml.
Total pore volume=0.65 cc./g.
Surface area=273 sq. m./g.

A portion of this catalyst was tested for hydro-desulfurization activity. The catalyst chosen for comparison as a baseline was tabletted RD–154 (catalyst 600–7027; run 11–352) a commercially marketed catalyst. The feedstock was "Wyoming Fluid Light Cycle Oil." The tests were conducted at 4 WHSV, 680° F. and 450 lbs./sq. in. pressure. The product from the first 12 hours was discarded and that from the 13th through 24th hours was checked. The catalyst 550–5004 gave 80.1 weight percent desulfurization, whereas 600–7027 gave 78.5% desulfurization. The ambient atmosphere surrounding the catalyst during test is primarily hydrogen, which is introduced at a rate of several thousand s.c.f./bbl. of feedstock; (s.c.f.=standard cubic feet).

The RD–154 catalyst used in preparing the baseline catalyst had 2.45% Co and 8.9% $MoO_3$ by analysis. A portion of ⅛″ diameter extruded RD–154 was ground, Sterotex blended, tabletted and calcined to produce 1/8" x 1/8" product (600-7027). Properties:

Crush=15 lbs./1/8" length
Settled apparent bulk density=0.78 g./ml.
Total pore volume=0.56 cc./g.
Surface area=248 sq. m./g.

Examples X to XIII

Reforming catalysts, catalysts A(410-1317), A'(410-1163), B(410-1319) and C(410-1350) essentially composed of novel boehmite of the present invention and 0.35, 0.35, 0.35 and 0.51 percent, respectively, of platinum, were employed under reforming conditions to reform standard East Chicago sponge oil with an RON of about 43. Catalysts A, B and C were in the form of 1/8" x 1/16" tablets and Catalyst A' was in the form of 1/16" diameter extrudate. Prior to processing the catalysts were reduced with hydrogen at 900° F., 6 s.c.f.h. and atmospheric pressure for 2 hours.

All processing was done at 350 p.s.i.g., 2.0 WHSV and 7/1 moles hydrogen gas/mole feed recycle rate. Each catalyst was subjected to an 8-hour conditioning period and two 8-hour tests at each of the following temperatures, in sequence: 880, 900, 915, 930 and 880° F. The catalyst charges were increased to insure that enough reformate would be produced to obtain complete analytical inspections.

General data on the catalysts are presented in Table II and catalyst inspection results are presented in Table III. Catalyst A was prepared from an oven-dried alumina hydrate (sample 410-1290) which had a surface area of 345 m.$^2$/g., a total pore volume of 1.29 cc./g., 0.49 cc./g. in pores greater than 100 A., and 0.55 cc./g. in pores greater than 80 A. Catalyst B was prepared from oven-dried alumina hydrate (sample 410-1311) which is described in Example VIII supra. Catalyst C was prepared from an alumina hydrate having particles of average dimensions of 3000 to 15,000 A. length and 300 to 3000 A. width. Catalyst A' was prepared from alumina hydrate (sample 410-1047-A) having a total pore volume of 1.91 cc./g. of which 1.8 cc./g. was in pores larger than 80 A., particles with average dimensions of 1500 to 5000 A. length and 70 to 500 A. width, with dimensions on sub-units of the particles of 50 to 200 A.

The data from the reforming tests have been correlated using conventional reforming correlation techniques. Each of the runs was correlated independently to obtain complete selectivity data at 85, 90, 95 and 100 RON clear. In some cases it was necessary to extrapolate to the 100 RON level. Isothermal temperature requirements were also correlated to give an approximate comparison of catalyst activities.

A comparison of the tabulated results indicates that the selectivities of all catalysts tested are similar. This can be illustrated by the following analysis of the correlated $C_5$—EP yields from the runs.

| C =EP RON Clear | 85 | 90 | 95 | 100 |
|---|---|---|---|---|
| Avg. $C_5$=EP Yield, Vol. Percent | 88.6 | 86.1 | 82.9 | 77.8 |
| Max. Deviation, Vol. Percent | 0.2 | 0.2 | 0.2 | 0.2 |
| Activity: Avg. Isothermal Temp., ° F. | 880 | 845 | 912 | 943 |

The deviations noted here are well within the accepted reproducibility limits of the isothermal pilot plant yield determinations. Therefore, it is concluded that all catalysts tested have essentially similar selectivities, within the limits of determination.

Catalysts 410-1163 showed very favorable aging characteristics when compared with a commercial alumina trihydrate-derived catalysts referred to in Example II and designated 980-15016.

TABLE II

| Example | Catalyst Sample | Method of Preparation | Alumina Type (dwg.) | XRD Analysis Percent Boehmite | XRD Analysis Size |
|---|---|---|---|---|---|
| X | A | AlCl$^3$+NH$^3$ (simultaneous addition) | Fig. 2 | 78 | 49 |
| XI | B | AlCl$^3$+(NH$^4$)$^2$CO$^3$ | Fig. 3 | 100 | 145 |
| XII | C | AlCl$^3$+Urea (slow addition) | Fig. 4 | 68 | 106 |
| XIII | A' | AlCl$^3$+Urea (slow addition) | Fig. 5 | 77 | 83 |

TABLE III

| | Sample Number | | | |
|---|---|---|---|---|
| | 410-1350 | 410-1317 | 410-1319 | 410-1163 |
| | Run Number | | | |
| | 9-781 | 9-787 | 9-791 | 9-799 |
| Alumina Analyses and Preparation: | | | | |
| Percent V.M. (1000° C.) | 22.1 | 20.8 | 20.4 | 21.0 |
| Percent Cl (As Recd.) | | 0.06 | 0.16 | 0.09 |
| Percent Fe (As Recd.) | | 0.0055 | | 0.0065 |
| Surface Area | 194 | 345 | 72 | 278 |
| XRD Percent Boehmite | 68 | 78 | 100 | 77 |
| Boehmite Size, A | 106 | 49 | 145 | 83 |
| Electron Microscope Plate No | 3622 | 3577 | 3602 | 3702 |
| Shape by Electron Microscope | (¹) | (²) | (³) | (¹) |
| Catalyst: | | | | |
| Percent V.M. (1000° C.) | 2.52 | 2.65 | 2.46 | 2.3 |
| Percent Pt (Ign. basis) | 0.51 | 0.349 | 0.366 | 0.34 |
| Percent Cl (As Recd.) | 0.50 | 0.41 | 0.44 | |
| Percent Fe (As Recd.) | 0.016 | 0.0086 | 0.0030 | |
| Crushing Strength, as calcined/after 16 hrs., 1,150° F | 12/8 | 15/10 | 14/9 | 17/15 |
| Catalyst Form | 1/8 D x 1/16 L | 1/8 D x 1/16 L | 1/8 D x 1/16 L | 1/16 extrudate |
| Pt.° by XRD | None | None | None | ⁴ None |
| α-Al$_2$O$_3$ Cryst. Size | 52 | 32 | 59 | ⁴ 45 |
| Surface area (calcined) | 276 | 339 | 278 | 307 |
| Pore Structure (calcined): | | | | |
| Total Volume, cc./g | 0.91 | 1.07 | 0.67 | 0.88 |
| Micro Pore Volume | | 0.88 | 0.02 | |
| Micro Pore Size, A.U. radius | | 33 | 23 | |
| Macro Pore Volume | 0.86 | 0.19 | 0.59 | 0.88 |
| Macro Pore Size, A.U. radius | 160 | 600-1500 | 250 | 72 |
| CO Chemisorption, cc. CO STP/g | 0.21 | 0.16 | 0.19 | 0.197 |
| Used Catalyst Inspections, Percent Carbon | 3.75 | 2.81 | 4.68 | 1.88 / 2.81 |

¹ Thin particles.
² Small particles+inchoate part.
³ Wide flat particles.
⁴ Based on component 410-1078.

The data are from aging runs made at 4 WHSV, 350 p.s.i.g., 7/1 moles/mole recycle ratio, and using East Chicago Sponge Oil as the feedstock.

The test data for 300 hours aging can be listed as:
(A) For 410–1163 tested at 950° F. temperature, in Run 9–807.

Hours:

| | Research octane neat, weathered product |
|---|---|
| 17 | 99 |
| 56 | 98 |
| 172 | 97 |
| 226 | 96 |
| 264 | 95 |
| 300 | 94 |

(B) For 980–15016, tested at 9945° F. temperature, in Run 9–849.

Hours:

| | Research octane neat, weathered product |
|---|---|
| 22 | 99 |
| 50 | 98 |
| 90 | 97 |
| 150 | 96 |
| 210 | 95 |
| 270 | 94 |
| 300 | 93.5 |

After 300 hours processing with Catalyst 410–1163, R9–807, it was demonstrated that the catalyst can be regenerated and regain its initial activity with the following values applying to the once-regenerated catalyst.

Hours:

| | Research octane neat, weathered product |
|---|---|
| 10 | 99 |
| 50 | 98 |
| 118 | 97 |

Examples XIV to XVII

Hydrogenation and desulfurization catalysts, Catalyst D (600–10001), E (600–10002), F (600–10003) and G (600–10004), essentially composed of the novel boehmite of the present invention and catalytic amounts of cobalt and molybdenum, were employed under hydrogenation and desulfurization conditions at 750° F., 500 p.s.i.g., 1.0 WHSV and 6000 s.c.f./bbl., once through hydrogen rate using a residual petroleum feedstock, the analysis of which is presented in Table IA.

| | |
|---|---|
| Gravity, ° API | 18.4 |
| percent H | 11.71 |
| percent S | 2.12 |
| percent N | 0.21 |
| Carbon residue (D–189) | 6.57 |
| Metals by Emis. Spec.: | |
| NiO, p.p.m. | 4.0 |
| $V_2O_5$, p.p.m. | 25.0 |
| Refractive Index at 80° C. (approx) | 1.512 |

Prior to processing, each catalyst was reduced at 700° F., presulfided at 350° F., and prewet with Light Cycle Oil (SRL–4216) at 350° F. and 500 p.s.i.g. pressure. General data on the catalysts are presented in Table IIA and virgin catalyst inspections are presented in Table IIIA. Catalyst D was prepared from an oven-dried alumina hydrate sample 410–1279 which had a surface area of 91 m.²/g., a total pore volume of 1.04 cc./g., 0.94 cc./g. in pores greater than 100 A., 0.95 cc./g. in pores greater than 80 A., particles with average dimensions of 3000 to 10,000 A. length and 1000 to 3000 A. width. Catalyst E was prepared from oven-dried alumina hydrate sample 410–1288 which had a surface area of 205 m.²/g., a total pore volume of 1.17 cc./g., 0.88 cc./g. in pores greater than 100 A., 0.98 cc./g. in pores greater than 80 A., particles with average dimensions of 1500 to 6000 A. length and 300 to 1500 A. width. Catalyst F was prepared from oven-dried alumina hydrate sample 410–1290 which is described in Example X supra. Catalyst G was prepared from oven-dried alumina hydrate sample 410–1006 which had a surface area of 145 m.²/g., a total pore volume of 1.18 cc./g. with over 0.8 cc./g in pores larger than 80 A., particles with average dimentions of 2000 to 10,000 A. length and 200 to 2000 A. width.

Following catalyst pretreatment, hydrogen flow was adjusted to 6000 s.c.f./bbl., once through, feed cut in at 1.0 WHSV, and the temperature raised to 750° F. at approximately 100° F. per hour. After the temperature reached 750° F. the unit was conditioned 8 hours after which 12 eight-hour tests were run.

TABLE IIA

| Example | Catalyst Sample No. | Method of Preparation of Alumina | Electron Mic. Plate No. | Alumina Type | XRD Analysis-Alumina | |
|---|---|---|---|---|---|---|
| | | | | | Percent Boehmite | Size |
| XIV | D | $AlCl_3$+urea | 3565 | Fig. 3 and inchoate | 57 | 141 |
| XV | E | $AlCl_3$+$NH_3$+urea | 3578 | Modified Fig. 2 | 87 | 92 |
| XVI | F | $AlCl_3$+$NH_3$ (simultaneous addition) | 3577 | Fig. 2 | 78 | 49 |
| XVII | G | $AlCl_3$+urea (slow addition, seeded) | 3652 | Fig. 5 | 78 | 83 |

TABLE IIIA

| Identity | Co-Mo on Crystalline Boehmite Experimental Catalysts | | | | |
|---|---|---|---|---|---|
| Calcination Temp., ° F | 900 | 900 | 900 | 900 | 1,050 |
| Sample Number | 600–10001 | 600–10002 | 600–10003 | 600–10004 | 600–10019 |
| Size (in.) | ⅛ x ⅛ | ⅛ x ⅛ | ⅛ x ⅛ | ⅛ | ⅛ |
| | Tablets | Tablets | Tablets | Extrudate | Extrudate |
| Alumina Crystal Size A | 141 | 92 | 49 | 139 | 139 |
| Total Pore Vol., cc./g | 0.77 | 0.72 | 1.04 | 0.62 | |
| Micro Pore Size, A | <50 | | 34 | * | |
| Micro Pore Volume | 0.19 | 0 | 0.77 | | |
| Macro Pore Size | 650 | 105 | 800 | | |
| Macro Pore Volume | 0.58 | 0.72 | 0.27 | | |
| Surface Area, m.²/g | 207 | 236 | 321 | 221 | 216 |
| Apparent Density, g./cc | 0.60 | 0.60 | 0.50 | 0.70 | 0.66 |
| Percent VM at 1200° F | 2.31 | 1.68 | 2.53 | 1.96 | 1.69 |
| $MoO_3$, wt. percent (ignited basis) | 9.9 | 8.8 | 8.7 | 11.8 | 11.8 |
| Co, wt. percent | 2.5 | 2.3 | 2.3 | 3.3 | 3.3 |

*Re: pore data for 600–10004: 0.49 cc./g. in pores averaging about 100 A.U. radius; 0.08 cc./g. in pores averaging about 1500 A.U. radius.

Liquid product from each test was collected directly from the high pressure receiver into a vented one-gallon can. Complete yield and hydrogen consumption data was obtained during tests 1, 2, 3, 5, 7, 9 and 12 of each run. The series of catalysts tested ranged from 44 to 70% desulfurization during test 1, to 30 to 50% during test 12 and the hydrogenation activity of the catalyst was satisfactory.

Example XVIII.—Preparation of catalysts containing the novel boehmite and catalytic amounts of chromia (500–7011 and 500–7017).

Alumina hydrate was first prepared using a reaction flask of about 10 gallons capacity (Pyrex, round-bottomed). The auxiliary equipment included heating mantle, stirrer, variable speed Sigmamotor pump, "reactant inlet" orifice, rheostats for current regulation, etc.

The initial solution in the flask was 13.8 liters of 2.0 molar ammonium chloride solution. After this had been heated to 208° F., and with heating toward refluxing conditions, the addition of a solution containing urea and aluminum chloride of 1.0 M and 0.3 M concentration, respectively, was started. A total of 24 liters of the latter was fed into the reaction flask during a period of 91 hours. Heating was continued for 8 additional hours.

The resultant slurry was filtered and the resultant filter cake then washed, by re-slurry-filter cycles, to lower the chloride content. During the first 12 cycles, dilute ammonium carbonate was added as required to keep pH in 8.5 to 9 area. By this stage, a portion of the acidified filtrate indicated chloride was absent. Three more re-slurry-filter cycles were applied to the hydrate using deionized water only. Subsequent analysis indicated 0.2% chloride on $Al_2O_3$ basis. The washed hydrate was spread in two 12" x 18" trays and oven-dried, after which the net weight was 397 g. It (410–1047-B) was a figure 5-type boehmite, 55% boehmite of 67 A. average crystallite size with a surface area of 316 m.²/g., a total pore volume of 1.03 cc./g., 0.5 cc./g. in pores greater than 80 A., particles with average dimensions of 500 to 7500 A. length and 200 to 500 A. width.

Procedures were then initiated to transform part of this oven-dried alumina hydrate into a catalyst having 11.5% $Cr_2O_3$–88.5% $Al_2O_3$ ratio, ignited basis. After grinding to pass 20-mesh sieve, determining that 5.0 g. was thoroughly wetted by 7.0 ml. of water, and procuring information regarding percent loss on ignition, an aqueous solution of $CrO_3$ (chromic anhydride) was prepared. 195 g. of the ground, oven-dried alumina was impregnated with 273 ml. of aqueous solution containing 25.4 grams of $CrO_3$. This composition was then oven-dried at 115° C. The dried product was lightly ground so that it would pass 20-mesh again, blended with 4 weight percent Sterotex die lubricant, tabletted into 1/8" x 1/8" size, and calcined in an air-atmosphere electric muffle. The temperature pattern was room temperature to start, 2 hours at 600° F., 1 hour at 800° F. and 3 hours at 1000° F., then cooled. The catalyst was assigned No. 500–7011. The crushing strength was 19.2 pounds per 1/8" length. This strength was maintained by a portion heated 16 hours at 1150° F., indicative of a stable structure. Analytical tests for 500–7011 disclosed: (a) 2.2% weight loss at 1000° C. (1830° F.); and 11.4% $Cr_2O_3$ content on ignited basis.

The preparation of co-precipitated catalyst 500–7017 was more direct, but also intended for the composition ratio of 11.5% $Cr_2O_3$–88.5% $Al_2O_3$, ignited basis. The essence of the preparation was to slowly introduce an aqueous, room temperature solution containing urea, chromic chloride and aluminum chloride, into a reaction vessel containing a refluxing aqueous solution. The heat of the latter resulted in the hydrolysis of the urea, increase of pH and precipitation of the aluminum and chromium cations which were in one solution as precipitation occurred. After washing the precipitated phase area, then dried dry, tabletted, and calcined.

The reaction flask was of about 11 liters capacity and equipped with accessories—stirrer, heater, thermometer, feed pump, etc.

The initial solution in the flask was 2 liters of mother liquor from an alumina hydrate production (run 1064–62–7). This was about 1 molar with respect to ammonium chloride solution and pH about 6.5 at room temperature. The solution to be pumped in was prepared by taking 8 liters of stock solution No. 1064–62–24 and dissolving therein 61.8 g. of $CrCl_3·6H_2O$. Stock solution 1064–62–24 contained 8.25 pounds of $AlCl_3·6H_2O$, 5.8 pounds of urea and 44 liters of deionized water. The pumping rate was planned for one and one-third milliliters per minute.

95±5 hours was used for pumping, 12 hours additional heating and 95±5 elapsed hours for washing. The washing procedure to remove extraneous chloride consisted of repeatedly dispersing the filter cake and re-filtering. For the first three cycles 1000 ml. of water was used each time. The filtration rate became relatively slow, so for the next eight cycles some ammonium carbonate solution was added to give pH 8.5 to 9. The final three cycles (12, 13 and 14) were with deionized water only.

The washed filter cake was oven-dried, ground to pass 20 mesh (5 g. sample 500–7016 was retained for X-ray study). To about 160 grams was added 6 to 7 g. Sterotex die lubricant, mixed and tabletted into 1/8" x 1/8" size. These were charged into an air-atmosphere electric muffle and heated 2 hours at 600° F., 1 hour at 800° F. and 3 hours and 10 minutes at 1000° F., then cooled. The catalyst was numbered 500–7017; Wt.=122 g.

The above catalyst, containing 12% chromia and 88% alumina, had a crushing strength of 12.5 pounds per 1/8" l.; surface area =289 sq. m./gram; total pore volume of 1.03 cc./g.; settled apparent bulk density=0.50 g./ml.; and 1.85% weight loss at 1000° C. (1830° F.).

Catalyst 500–7017 (catalyst H) was employed as a dehydrogenation catalyst to dehydrogenate light paraffin hydrocarbons, e.g. propane and butane, to olefins. In the dehydrogenation of butane, a pure grade butane was contacted with catalyst H at 1000° F., 1 Atm., 30 minutes on stream in Runs Nos. 1075–84, 1075–86 and 1075–88. The results of these runs are provided in Table IV.

TABLE IV

| Run | WHSV | Butane Conv., Wt. Percent | Sel. to Butenes, Mole Percent | Cracked Products, Wt. Percent | Coke, Wt. Percent |
| --- | --- | --- | --- | --- | --- |
| 1075–84 | 1.43 | 51.2 | 61.1 | 12.4 | 3.9 |
| 1975–86 | 1.97 | 46.9 | 68.0 | 9.3 | 2.6 |
| 1075–88 | 3.72 | 34.4 | 70.6 | 7.3 | 1.1 |

It is claimed:

1. A novel boehmite alumina product with particles of irregular edges, a pore structure totalling at least about 0.5 cc. per gram in pores larger than 80 A. in size, an average crystallite size greater than about 40 A. up to about 200 A. by X-ray diffraction, and composed of a non-homogeneous integral aggregation of polycrystalline boehmite sub-units, said particles having a largest dimension of at least about 500 A. by electron microscope.

2. The product of claim 1 wherein the product is platelet in form.

3. The product of claim 1 wherein the product is granular in appearance and the particles are acicular in form.

4. The product of claim 1 which is that crystallographically depicted in FIGURE 1.

5. The product of claim 1 which is that crystallographically depicted in FIGURE 2.

6. The product of claim 1 which is that crystallographically depicted in FIGURE 3.

7. The product of claim 1 which is that crystallographically depicted in FIGURE 4.

8. The product of claim 1 which is that crystallographically depicted in FIGURE 5.

References Cited

UNITED STATES PATENTS

| 2,838,375 | 6/1958 | Teter et al. | 23—142 |
|---|---|---|---|
| 2,915,475 | 12/1959 | Bugosh | 23—141 X |
| 3,031,418 | 4/1962 | Bugosh | 23—141 X |
| 3,056,747 | 10/1962 | Arthur | 23—141 X |
| 3,108,888 | 10/1963 | Bugosh | 23—141 X |

OSCAR R. VERTIZ, *Primary Examiner.*

BENJAMIN HENKIN, MILTON WEISSMAN,
*Examiners.*

H. T. CARTER, *Assistant Examiner.*

UNITED STATES PATENT OFFICE
CERTIFICATE OF CORRECTION

Patent No. 3,376,106                          April 2, 1968

John L. Gring et al.

It is certified that error appears in the above identified patent and that said Letters Patent are hereby corrected as shown below:

Column 1, line 49, "crystalline" should read -- crystallite --. Column 2, line 58, "wherein" should read -- whereas --. Column 4, line 2, "alumina" should read -- aluminum --; line 56, "wate" should read -- water --. Column 5, line 20, "ways" should read -- way --. Column 6, line 6, after "hydrous alumina" insert --. While platinum is preferably combined with the alumina --; line 23, "they" should read -- the --. Column 8, line 48, "at" should read -- a --. Column 9, line 27, "were" should read -- was --. Column 10, line 1, "influence" should read -- influent --; lines 5 and 6, "designed" should read -- designated --; line 24, "precedure" should read -- procedure --; lines 45 and 46, "catalystic", each occurrence, should read -- catalytic --; same line 46, "perforance" should read -- performance, --; in the table, first column, line 2 thereof, after "Commercial" insert -- $Al_2O_3 \cdot 3H_2O$ derived catalyst --. Column 11, line 19, "(41-1222)" should read -- (410-1222) --; line 54, "weighted should read -- weighed --. Column 12, line 39, after "$AlCl_3$," insert -- urea -- same column 12, in the table, first column, line 7 thereof, after "Crystallite size by XRD" insert -- A --; line 70, "11 A.U." should read -- 131 A.U. --. Column 13, line 1, "area" should read -- urea --; line 44, "than" should read -- then --. Column 14, line 16, after "months" insert -- storage --. Column 16, line 34, "415-1330" should read -- 410-1330 --. Column 17, line 13, "or reflux" should read -- of reflux --; line 40, "thet" should read -- the --. Column 18, line 45, "aded" should read -- added --. Column 20, in the heading to the table, first column, "C = EP RON Clear" should read -- $C_5$ = EP RON Clear --. Column 21, line 17, "9945° F." should read -- 945° F. --. Column 22, line 5, before the table insert the heading: -- Table IA, Feedstock Inspections --. Column 24, in the table, first column, line 2 thereof, "1975-86" should read -- 1075-86 --.

Signed and sealed this 10th day of March 1970.

(SEAL)
Attest:

EDWARD M. FLETCHER, JR.                      WILLIAM E. SCHUYLER, JR.
Attesting Officer                               Commissioner of Patents